United States Patent [19]

Frohlich et al.

[11] 4,121,746
[45] Oct. 24, 1978

[54] APPARATUS FOR FORMING A CIRCUMFERENTIAL WELD

[75] Inventors: Richard L. Frohlich, Tampa; William E. Bitzer, Tarpon Springs, both of Fla.

[73] Assignee: Westinghouse Electric Corp., Pittsburgh, Pa.

[21] Appl. No.: 802,935

[22] Filed: Jun. 2, 1977

[51] Int. Cl.² .................... B23K 9/18; B23K 37/02; B23K 37/04
[52] U.S. Cl. .................................... 228/9; 219/60 R; 219/73; 219/124.34; 228/45; 228/48
[58] Field of Search .................... 228/9, 41, 48; 219/60 R, 61, 73 R, 124, 124.34

[56] References Cited

U.S. PATENT DOCUMENTS

| 1,740,117 | 12/1929 | Pinckney | 228/45 X |
| 2,153,785 | 4/1939 | Williams | 219/73 R X |
| 2,903,565 | 9/1959 | Launder et al. | 219/124 |
| 3,129,858 | 4/1964 | Miller et al. | 222/160 X |
| 3,171,012 | 2/1965 | Morehead | 219/124 |
| 3,243,094 | 3/1966 | Lucas | 219/124 X |
| 4,040,557 | 8/1977 | Heverly | 228/9 |

Primary Examiner—James L. Jones, Jr.
Assistant Examiner—K. J. Ramsey
Attorney, Agent, or Firm—F. J. Baehr, Jr.

[57] ABSTRACT

Apparatus for automatically forming a circumferential weld on a cylindrical member utilizing an A-frame structure which straddles the cylindrical member.

9 Claims, 5 Drawing Figures

APPARATUS FOR FORMING A CIRCUMFERENTIAL WELD

BACKGROUND OF THE INVENTION

1. Field of the Invention

This invention relates to apparatus for producing a circumferential weld on a cylindrical vessel and more particularly to such apparatus that straddles the vessel.

2. State of the Prior Art

Apparatus presently utilized to produce such welds have been cantilever manipulators which consist of a motorized car which rides on a railway-type steel track. Extending vertically from the car is a mast that is capable of being rotated either electrically or mechanically. Extending horizontally from the mask is a boom, which is slidably disposed on the mast. The boom may be raised or lowered with respect to the mast and also extend inwardly or outwardly horizontally with respect to the mast. Welding equipment is mounted on one end of the horizontal boom and a welding operator's chair and control panel is mounted on the end to permit observation and control of the welding operation. The welding equipment, controls, and operator produce a concentrated load at the end of the boom that is cantilevered from the mast. This concentrated load at one end of the boom results in boom deflection, backlash in rotating and lifting mechanisms, and motion in the end of the boom due to movement of the operator. As cantilever manipulators age and the bearing surfaces and gears wear, the end of the boom becomes more unstable, thereby exhausting the probability of defects in the weld. The cantilever manipulators also require a large amount of floor space and operators feel insecure sitting on the end of the booms. Therefore, it is desirable to provide a welding manipulator which takes up less floor space, is more stable, and makes the operator feel secure.

SUMMARY OF THE INVENTION

In general, apparatus for forming a circumferential weld on a cylindrical member having a circumferential groove, when made in accordance with this invention, comprises a plurality of A-shaped or A-frame structures, a bridge between the A-frame structures, a welding head for laying a weld bead in the groove of the cylindrical member and a device for rotating the cylindrical member about its axis. The apparatus also comprises a device for moving the weld head horizontally in a plane generally parallel to a plane passing through the circumferential weld, apparatus for moving the weld head vertically in a plane generally parallel to a plane through the circumferential weld and a device for moving the weld head horizontally in a plane generally perpendicular to the plane passing through the circumferential weld. The apparatus also has a probe disposed to run in the groove and respond to vertical and horizontal variations in the groove to signal the devices which move the welding head vertically and horizontally to move the welding head in order to compensate for such variations in the groove and thereby automatically produce a very high quality circumferential weld.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
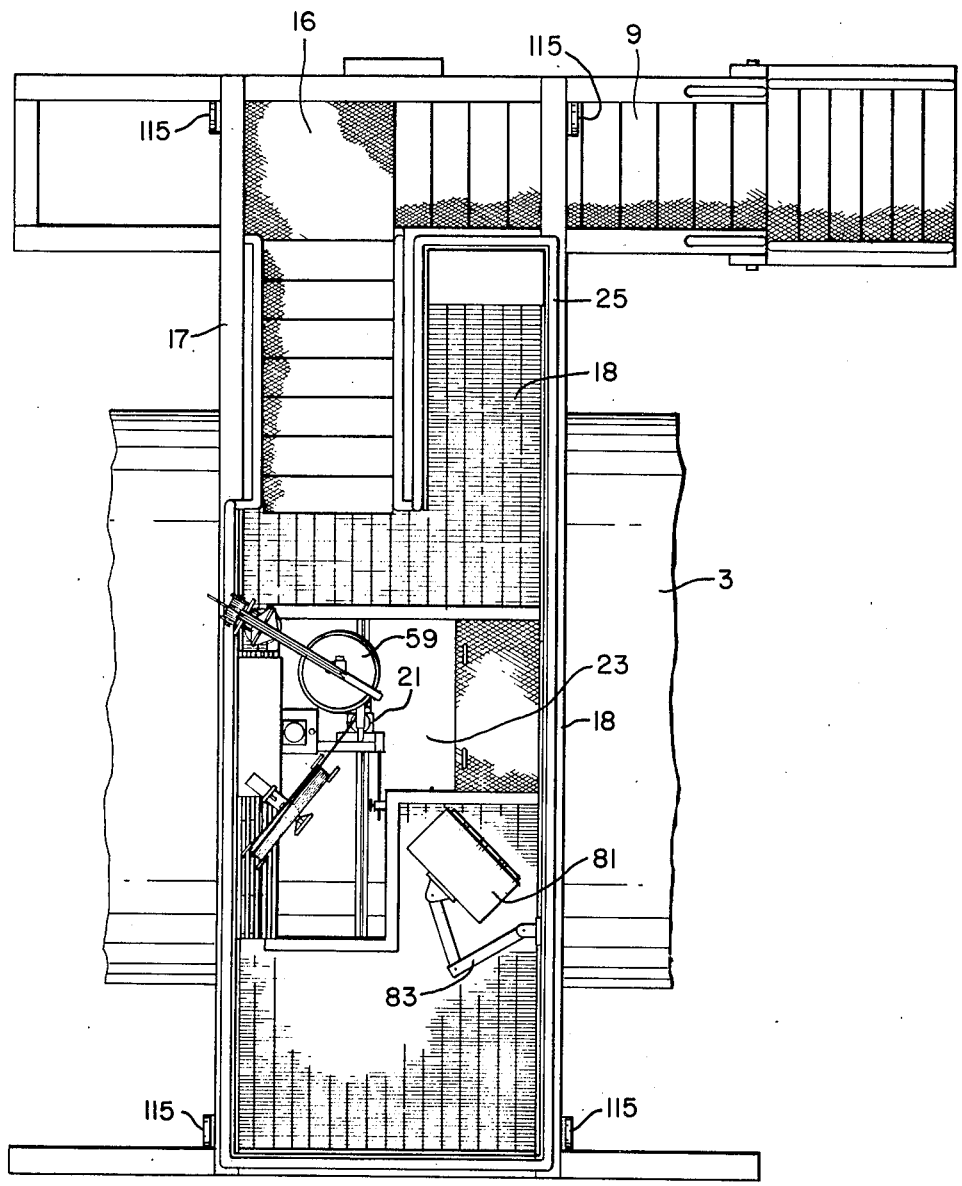
FIG. 1 is a plan view of welding apparatus made in accordance with this invention.
Figure 2:
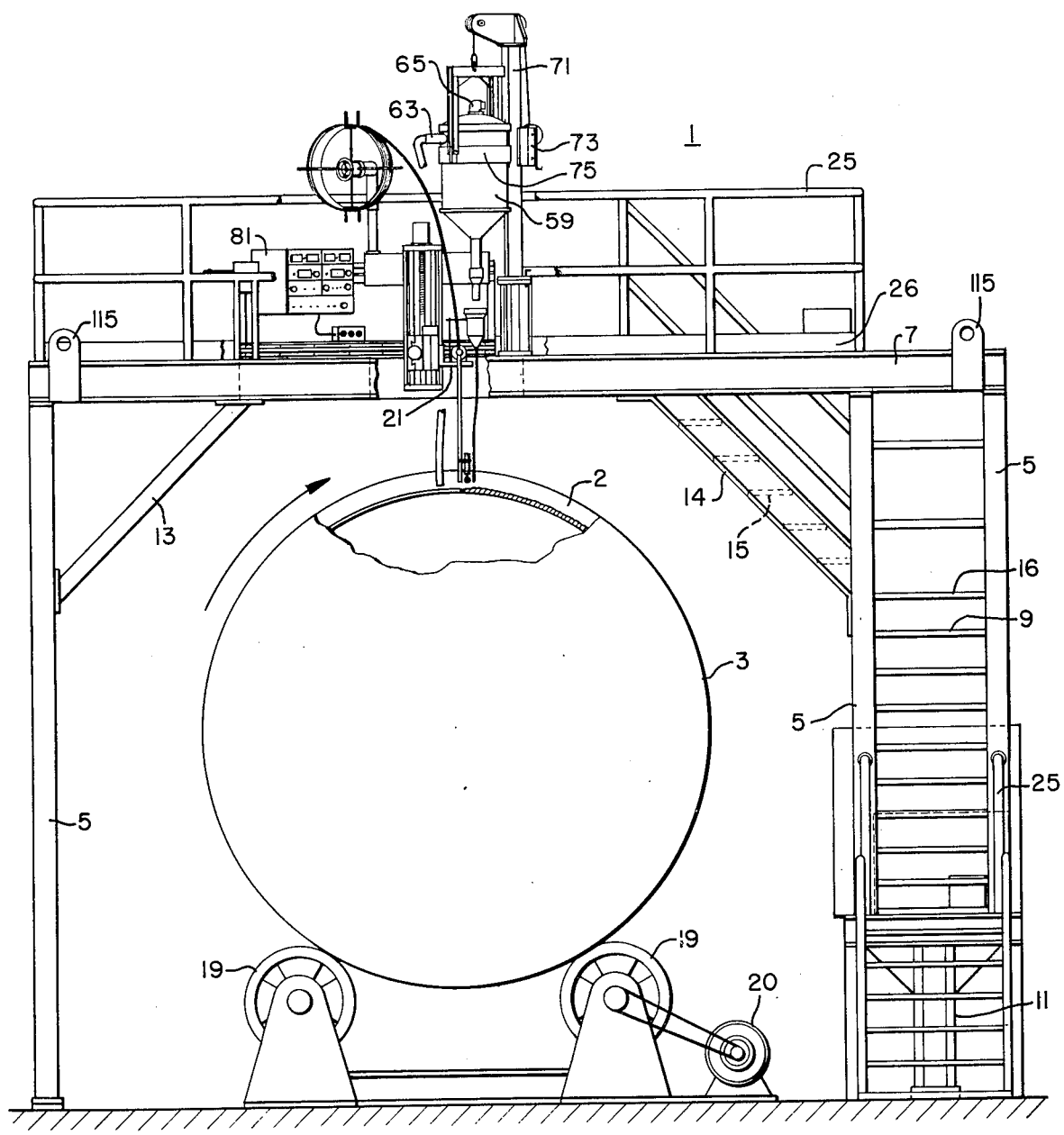
FIG. 2 is an elevational view partially in section of the welding apparatus.
Figure 3:
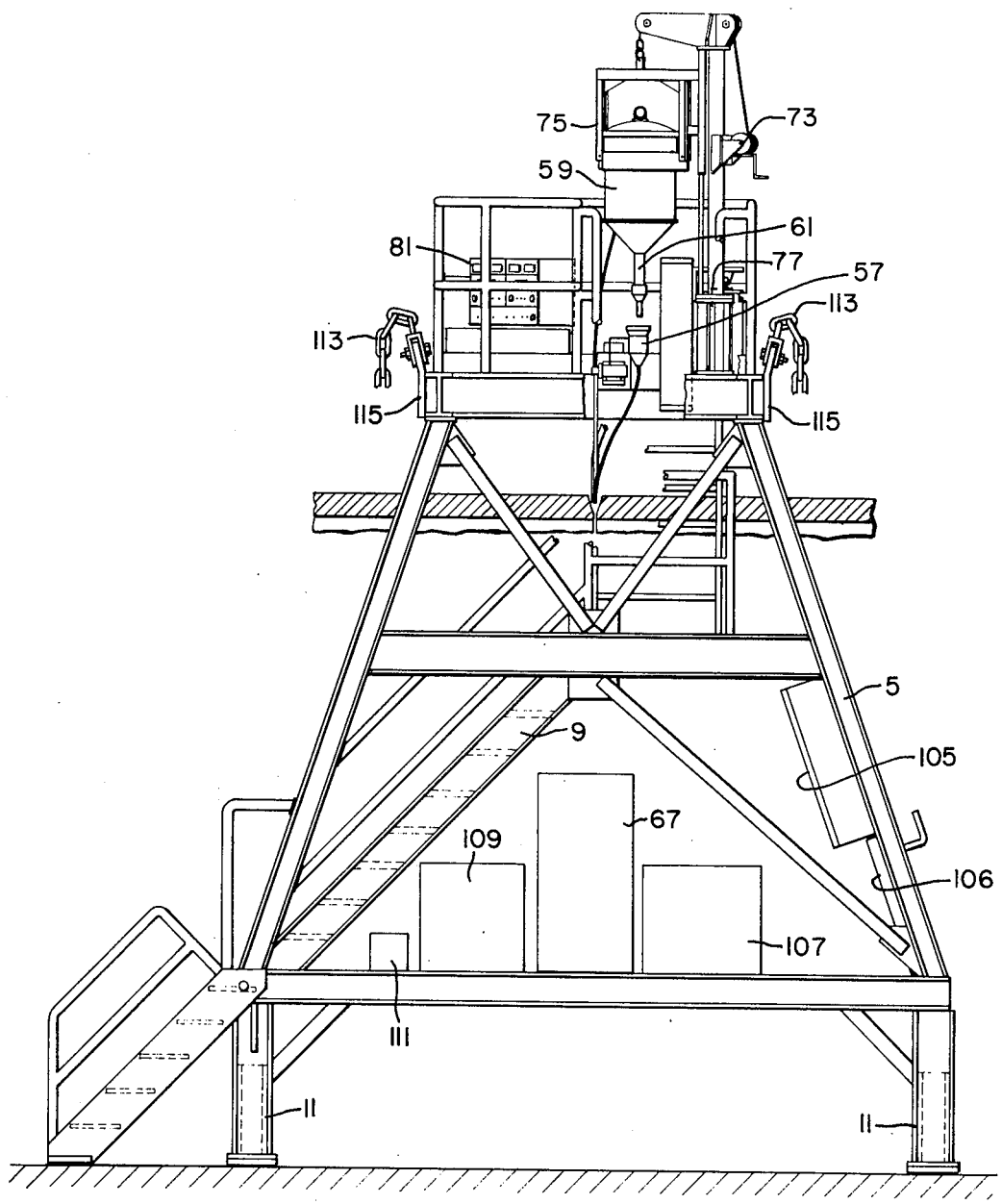
FIG. 3 is another elevational view partially in section of the welding apparatus.

Referring now to the drawings in detail and in particular to FIGS. 1 through 3, there is shown an apparatus 1 for forming a circumferential weld in a groove 2 on a cylindrical member, tank or vessel 3. The apparatus 1 comprises a plurality of truncated A-frame structures 5 disposed on opposite ends of a bridge 7. One end of the bridge 7 is connected to a single A-frame structure 5, while a pair of A-frame structures 5 are connected to the other end of the bridge 7. A stairway 9 connects the pair of A-frame structures 5 providing access to the bridge 7 and increasing the rigidity of the apparatus 1. The truncated A-frame structures 5 generally taper inwardly toward the top at an angle of approximately 15° and have telescoping legs 11 which allow the bridge 7 to be set at various elevations to accommodate cylindrical members or tanks 3 of various diameters.

Knee braces 13 and 14 further increase the rigidity of the structure without affecting the size of the cylindrical members that can be welded. The knee braces 14 have stair treads 15 disposed therebetween and are connected with the stairway 9 between the pair of A-frame structures 5 by a landing 16 to provide access to the bridge 7.

The bridge 7 is formed from structural shapes such as I-beams 17 and is covered with grating 18 to provide a work platform. The cylindrical member or tank 3 is mounted on rollers 19 which are driven by a motor or other drive means 20 to rotate the cylindrical member 3 about its longitudinal axis.

A welding head 21 is mounted on the bridge 7 and the grating 18 has an L-shaped opening 23 providing access to the upper portion of the cylindrical member 3. A handrail 25 and toe plate 26 surrounds the bridge 7 and extends along each side of the stairway to protect the operator as he moves about the apparatus and also conforms to the safety requirements as set forth by the Occupational Safety and Health Act.

Figure 4:
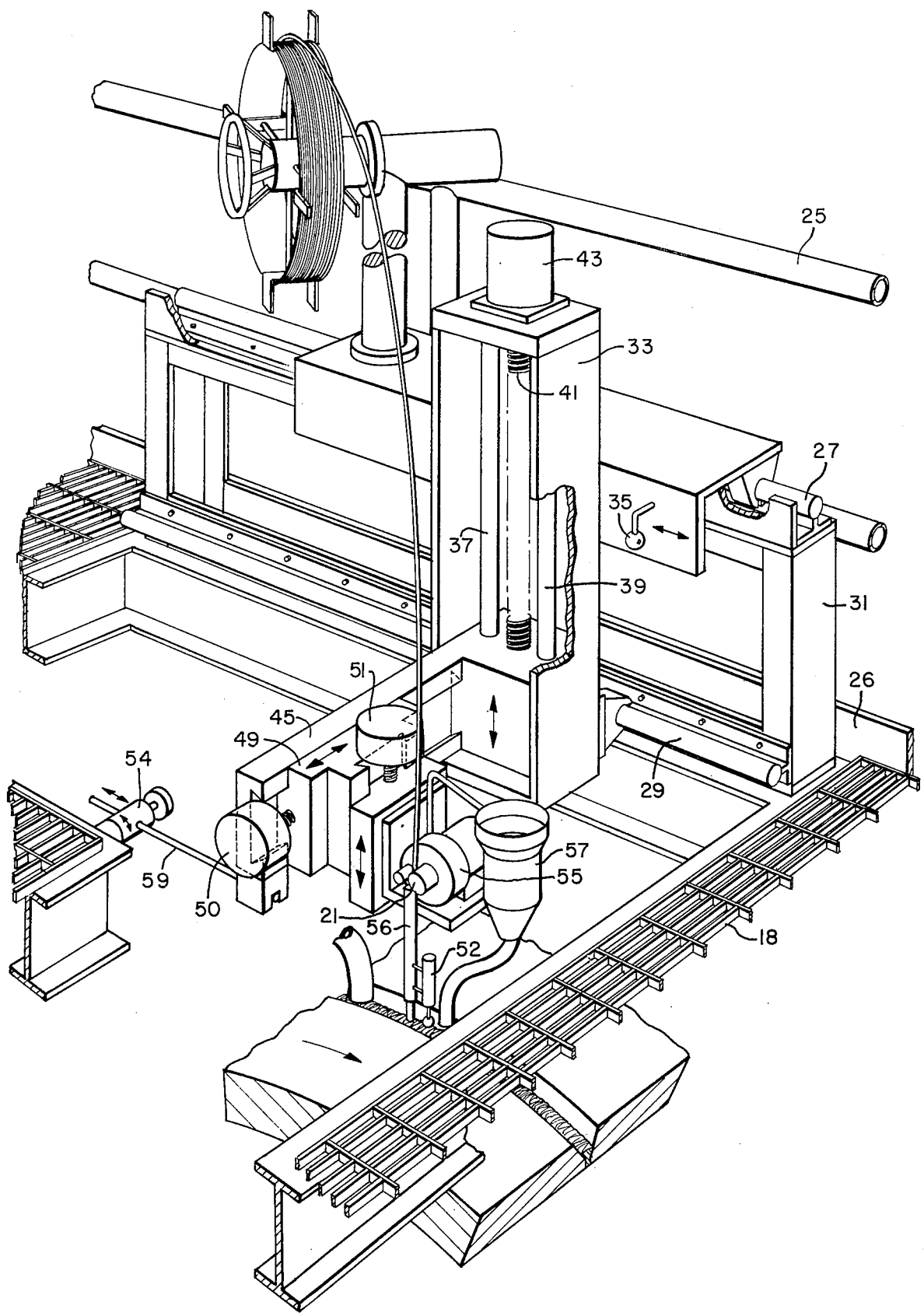
FIG. 4 is a perspective view of a welding head and its mounting.

As shown in FIG. 4, the welding head 21 is mounted so that it moves in X, Y, and Z directions. In order to provide this movement, the welding head 21 is slidably mounted on two parallel hardened steel ways or bars 27 and 29 which are fastened rigidly to the bridge 7. The ways 27 and 29 are generally disposed parallel to each other and to a plane extending through the circumferential weld. A plane disposed to pass through the axis of the ways 27 and 29 is generally disposed in a plane which is generally parallel to a plane extending through the circumferential weld; however, a plane disposed through the axis of both ways 27 and 29 forms an angle with the plane through the circumferential weld. The way 27 is disposed above brackets 31 which extend upwardly from the bridge 7 and the way 29 is disposed adjacent the lower end of the brackets 31.

A vertically oriented slide member 33 is slidably mounted on the ways 27 and 29 so as to allow the welding head to move horizontally in a plane generally parallel to a plane through the circumferential weld or in the X direction. A clamp 35 or other locking means is disposed to fix the position of the vertical slide member 33 with respect to the ways 27 and 29.

The vertically oriented slide member 33 comprises two guide ways or bars 37 and 39 and a screw 41 disposed generally vertically and parallel to each other. The guide bars 37 and 39 and screw 41 are generally disposed in a plane generally parallel to a plane through the circumferential weld. A gear reducer motor 43 or other drive means is connected to the screw 41 to move the weld head vertically in a plane generally parallel with a plane through the circumferential weld providing vertical or Y directional movement of the welding head 21.

A horizontally oriented slide member 45 is slidably mounted on the bars 37 and 39 and has a nut (not shown) which engages the screw 41 to move the weld head 21 vertically. The horizontally oriented slide member 45 has a pair of dove-tailed plates 47 and 49 slidably disposed with respect to each other and a gear reducer motor 50 or other drive means cooperatively associated therewith to slide one plate relative to the other to move the welding head 21 in a plane perpendicular to a plane through the circumferential weld or in the Z direction. The horizontally oriented slide member 45 also has guide ways and a gear-reducing motor 51 which cooperate to move the welding head 21 vertically or in the Y direction, thus providing a second vertical drive mechanism. This second vertical drive mechanism has a much shorter stroke than the first-mentioned vertical drive.

A probe 52 is disposed on the welding head and controls the drives 43, 50 and 51 so that the weld head is maintained in a predetermined position relative to the weld groove 2 on the cylindrical member 3.

To further stabilize the welding head, an adjustable arm 53 is pivotally mounted on the slide member 45 and pivotally and slidably mounted on the bridge 7 by a locking bracket 54 which is tightened after the slide member is positioned.

The welding head 21 has at least one weld wire drive 55 and guide 56 for submerged arc welding. A flux feedhopper 57 is also disposed on the welding head 21 to supply the flux necessary for submerged arc welding.

A flux dispensing system is cooperatively associated with the welding head 21 and comprises a flux dispenser 59 which incorporates a cylindrical separator and a flux discharge nozzle 61, the latter being disposed in the bottom of the flux dispenser 59. A vacuum inlet nozzle 63 is tangentially disposed in the side of the flux dispenser 59 and a vacuum outlet nozzle 65 is disposed in the upper portion of the flux dispenser 59. The flux dispensing system also comprises a means for producing a vacuum 67 in the flux dispenser such as a blower or other device and is connected to the flux dispenser via hoses or other conduits (not shown). The flux dispenser 59 is mounted on a removable swinging crane 71 which swings the flux dispenser 59 over the flux hopper 57 and also swings it into position for reloading. A winch 73 and saddle 75 are operable to raise and lower the flux dispenser 59 to facilitate reloading the flux dispenser with flux stored on the bridge 7. Locking means 77 are provided to prevent the flux dispenser from swinging except when desired by the operator. The removable crane 71 and flux dispenser 59 can be removed by an overhead crane and lowered to the floor to facilitate operation and maintenance. A control panel 81 is mounted on the bridge 7 and has an articulated arm 83 connecting the control panel 81 to the bridge 7 so that an operator may move the control panel 81 to any convenient location to facilitate operation during the welding process.

Figure 5:
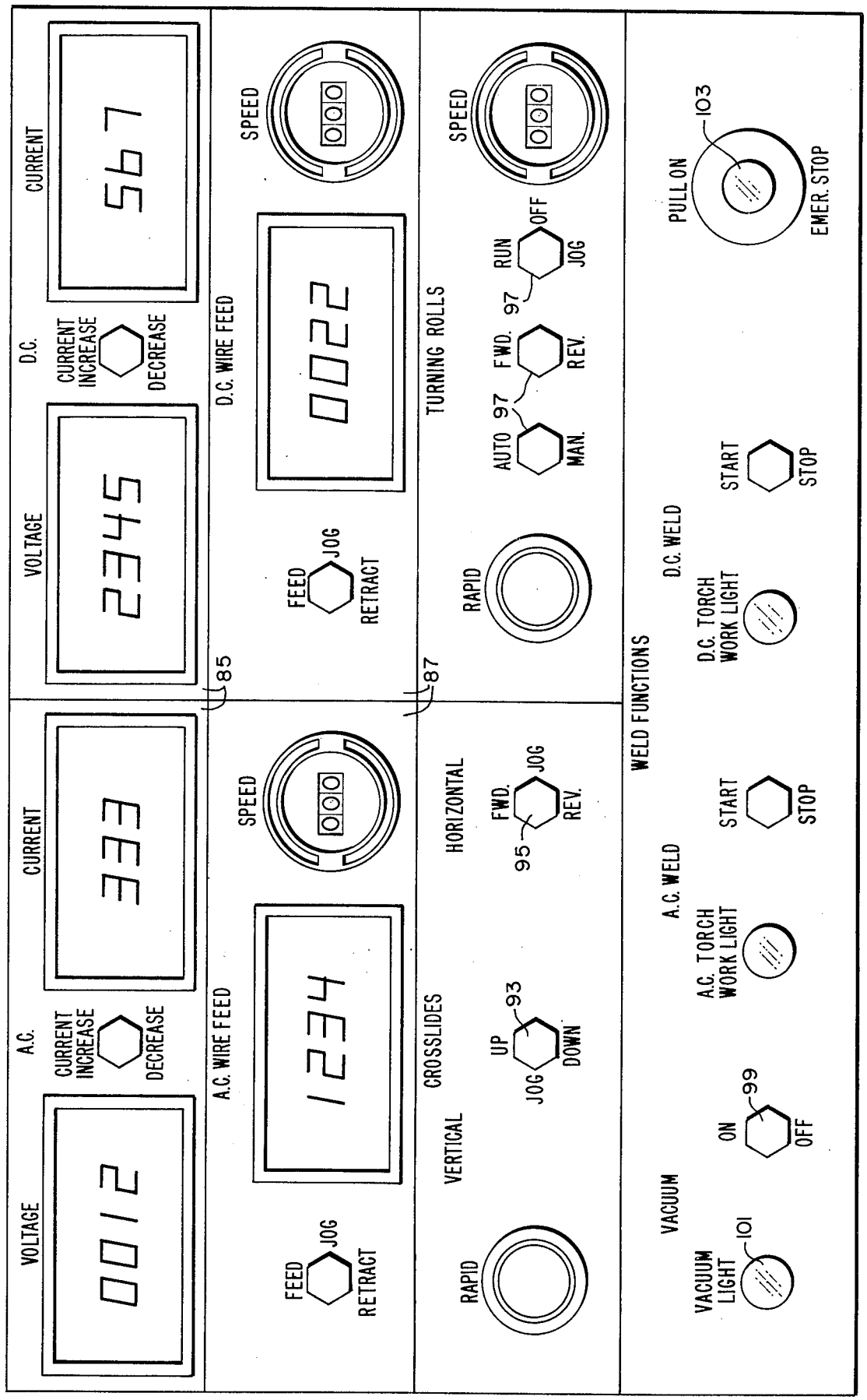
FIG. 5 is an elevational view of a control panel for the apparatus.

As shown in FIG. 5, the control panel 81 incorporates the controls for the welding equipment display 85, numerical indication of AC and DC currents and voltage, and provides switches for increasing and decreasing these values. The face of the control panel is divided into colored segments which relate to their function in the system to facilitate easy explanation of the controls to new or untrained personnel. Wire feed 87 is also numerically displayed and a switch for adjusting the wire feed is disposed adjacent thereto. Switches 93 and 95 for moving the welding head 21 in the Y and Z direction, respectively, are disposed on the control panel 81, along with switches 97, which operates the drive means for the roller 19 which rotates the cylindrical member about its longitudinal axis. Switch 99 and indicator 101 for the vacuum system are also disposed on the central control panel 81. An emergency stop bottom 103 is provided to stop the whole operation in case of emergency.

An electrical distribution panel 105, a primary electrical power panel 106, welding power supplies 107 and 109, and a transformer 111, are mounted under the stairway 9 adjacent the flux vacuum means to provide easy access thereto and to make the apparatus for producing a circumferential weld on a cylindrical vessel self-contained.

Lifting chains 113 are connected to the four corners of the bridge 7 by eyes or lifting lugs 115 providing means by which the entire apparatus 1 may be lifted by an overhead crane and moved from one location to another.

The apparatus 1 hereinbefore described advantageously incorporates the latest solid state welding equipment and controls to facilitate high quality and high production rate of circumferential seam welds on cylindrical vessels by virtually eliminating transverse motion of the welding head 21 caused by normal movement of the operator as he monitors the welding operation. Successfully minimizing transverse motion reduces welding defects by preventing contact of the welding tip with the workpiece which causes the tip to arc out on the side walls of the weld groove and deposit inclusions of copper in the weld. The pair of modified A-frame structures 5 with the stairway 9 disposed therebetween adds structural support to the load-bearing members and provides space for and protection to the welding power supply, flux vacuum system and electrical distribution box and places them in a position where they may be readily maintained. This equipment is mounted at a sufficiently high elevation to straddle turning rolls and their drive housings making for a compact installation. The bridge 7 serves as an operator platform by supporting the equipment associated with the actual welding operation; e.g., the operator control panel 81, the welding head 21, wire feed mechanisms and auxiliary motorized slide wire rails, flux recovery and dispensing equipment. The apparatus hereinbefore described also advantageously provides a rigid structure for supporting the welding head 21 and resisting deflections in the X, Y or Z direction resulting from normal operator movements, provides improved access to the work area via the stairway 9, permits permanent mounting of many of the power cables, places the power supply and auxiliary equipment near the floor in order to lower the center of gravity of the structure, improves the accessibility of this equipment to maintenance personnel, provides adjustable height flux dispenser in order to minimize the hazard to personnel loading the equipment with welding flux, and reduces the manufacturing floor space required to produce high quality circumferential welds.

What is claimed is:

1. Apparatus for forming a circumferential weld in a circumferential groove on a cylindrical member disposed at a predetermined position within said apparatus, said apparatus comprising:

a plurality of A-frame structures;

a bridge disposed between said A-frame structures;

a welding head for laying a weld bead in said circumferential groove;

means for rotating said cylindrical member about its longitudinal axis;

means for moving said welding head horizontally in a plane generally parallel to a plane passing through said circumferential groove, said means for moving the welding head horizontally in a plane generally parallel to a plane passing through said circumferential groove comprises a first bar rigidly mounted on the bridge and a second bar rigidly mounted on said bridge and generally parallel to said first bar, said bars being disposed in a plane forming an acute angle with said plane passing through the circumferential groove, means for sliding said welding head longitudinally along said bars and means for locking said weld head in any longitudinal position with respect to said bars;

means for moving said welding head vertically in a plane generally parallel to a plane passing through said circumferential groove;

means for moving said welding head horizontally in a plane generally perpendicular to a plane passing through said circumferential groove; and, a probe which is disposed to run in said circumferential groove and respond to vertical and horizontal variations in the circumferential groove to signal the means for moving said welding head vertically and to move said welding head horizontally in a plane perpendicular to a plane passing through said circumferential groove to compensate for variations in said groove and said cylindrical member to automatically provide a high circumferential weld.

2. The apparatus as set forth in claim 1, wherein the plurality of A-frame structures comprise one A-frame structure disposed on one side of the bridge and a pair of A-frame structures disposed on the other side of the bridge, the pair of A-frame structures being structurally connected by a stairway which improves the rigidity of the entire structure.

3. The apparatus as set forth in claim 2, wherein an electrical distribution panel, a welding power supply and a flux vacuum system are disposed on said pair of A-frame structures.

4. The apparatus as set forth in claim 2, wherein each A-frame structure has telescoping legs to accommodate various sizes of cylindrical members.

5. The apparatus as set forth in claim 1, wherein the bridge has an opening through which the welding head is accessible to the cylindrical member.

6. The apparatus as set forth in claim 1 and further comprising a flux dispenser movably mounted on said bridge.

7. The apparatus as set forth in claim 1 and further comprising a flux dispenser mounted on said bridge so that it can be raised and lowered and swings to permit easy filling and positioning for operation of the welding head.

8. The apparatus as set forth in claim 1 and further comprising a control panel for operating the welding head, the control panel being articulately mounted on the bridge to provide easy access to the operator for monitoring the welding operation.

9. The apparatus as set forth in claim 1 and further comprising an adjustable arm connecting the welding head to the bridge to improve the stability of the welding head.

* * * * *